Patented Mar. 23, 1954

2,673,199

UNITED STATES PATENT OFFICE 2,673,199

METALLIFEROUS AZO DYESTUFFS

Willy Widmer, Bottmingen, Christian Zickendraht, Binningen, and Arthur Buehler, Rheinfelden, Switzerland, assignors to Ciba Limited, Basel, Switzerland, a Swiss firm No Drawing. Application April 10, 1951,
Serial No. 220,338

Claims priority, application Switzerland
April 21, 1950

14 Claims. (Cl. 260—145)

According to this invention valuable new metalliferous azo-dyestuffs, which contain one atom of metal bound in complex union to two molecules of different ortho:ortho'-dihydroxy-monoazo-dyestuffs are made by treating with an agent yielding metal a mixture of two different ortho:ortho'-dihydroxy-monoazo dyestuffs which are free from sulfonic acid groups and carboxyl groups and of which at least one contains a sulfonic acid amide group and at least one corresponds to the general formula (1) 

in which $R_1$ and $R_2$ each represent a mononuclear radical of the benzene series linked to the azo group in ortho-position relative to the hydroxyl group and one of the radicals $R_1$ and $R_2$ contains at least one nitro group.

The monoazo-dyestuffs corresponding to the above general formula and used as starting materials in the present invention can be obtained by coupling an ortho-hydroxy-diazo compound of the benzene series containing at least one nitro group and free from sulfonic acid groups and carboxyl groups with a hydroxybenzene capable of coupling in ortho-position to the hydroxyl group and which is also free from sulfonic acid groups and carboxyl groups. The coupling may be carried out by the usual known methods, advantageously in an alkaline medium.

As ortho-hydroxy-diazo-compounds containing nitro groups there are advantageously used diazo compounds of nitro-ortho-hydroxy-amines of the benzene series of which the benzene nucleus contains, in addition to the nitro, hydroxyl and amino groups, further substituents, such as halogen atoms (for example chlorine), alkyl groups (for example methyl), sulfonic acid amide groups or advantageously acylamino groups, especially those having few carbon atoms (for example acetyl-amino).

As examples of such ortho-hydroxy-amines there may be mentioned: 4-, 5- or 6-nitro-2-amino-1-hydroxybenzene, 4-methyl-5- or -6-nitro-2-amino-1-hydroxybenzene, 4-chloro-5- or -6-nitro-2-amino-1-hydroxybenzene and especially 4-nitro-6-chloro-2-amino-1-hydroxybenzene, 4-nitro-6-acetyl-amino-2-amino-1-hydroxybenzene, 4:6-dinitro-2-amino-1-hydroxybenzene, 6-nitro-2-amino-1-hydroxybenzene-4-sulfonic acid amide, 4-tertiary-amyl-6-nitro-2-amino-1-hydroxybenzene and 4-nitro-2-amino-1-hydroxybenzene-6-sulfonic acid amide.

As coupling components there come into consideration more especially hydroxy-benzenes which contain as a substituent in para-position to the hydroxyl group an acylamino group or especially an alkyl group, such as those which contain few carbon atoms, for example 1 to 6 carbon atoms, such as a methyl, secondary butyl or tertiary amyl group. As examples of such coupling components there may be mentioned: 4-methyl-1-hydroxybenzene, 4-isopropyl-1-hydroxybenzene, 4-tertiary-amyl-1-hydroxybenzene, 2:4- or 3:4-dimethyl-1-hydroxybenzene, 4-acetylamino-3-methyl- or -3:5-dimethyl-1-hydroxybenzene, 4-methyl-2-acetylamino-1-hydroxybenzene, 4-acetylamino-1-hydroxybenzene, 4-n-butyrylamino-1-hydroxybenzene, 4-methyl-2-n-butyrylamino-1-hydroxybenzene, 4-tertiary-amyl-2-formylamino-1-hydroxybenzene and 4-methyl-1-hydroxyphenyl (2)-carbamic acid methyl ester.

The ortho:ortho'-dihydroxy-monoazo-dyestuffs used with the ortho:ortho'-dihydroxy-monoazo dyestuff of the Formula 1 to prepare the mixture used as starting materials in the present process can be prepared, for example, by coupling an ortho-hydroxy-diazo compound of the benzene series with a compound capable of coupling in a position vicinal to a hydroxyl group which may be an enolized keto group, both of the starting materials being free from sulfonic acid groups and carboxyl groups. Especially valuable are the dyestuffs containing at least one sulfonic acid amide group; only dyestuffs of this character are to be used if the dyestuffs of the Formula 1 are free from sulfonic acid amide groups.

As ortho-hydroxy-diazo-compounds for preparing these dyestuffs there come into consideration, for example, those which are mentioned above and 4-chloro-2-amino-1-hydroxybenzene, 4:6-dichloro-2-amino-1-hydroxybenzene and 3:4:6-trichloro-2-amino-1-hydroxybenzene. Good results are obtained with diazo compounds of amines containing sulfonic acid amide groups such, for example, as the diazo compounds of 2-amino-1-hydroxybenzene-4- or -5-sulfonamide, 6-nitro-2-amino-1-hydroxybenzene-4-sulfonamide, 2-amino-1-hydroxybenzene-4-sulfonic acid methyl amide or 4-nitro-2-amino-1-hydroxybenzene-6-sulfonic acid amide.

As examples of suitable coupling components of the kind mentioned above there may be mentioned: Compounds containing phenolic hydroxyl groups, such as the para-substituted hydroxybenzenes hereinbefore mentioned, and especially hydroxynaphthalenes such, for example, as 2-hydroxynaphthalene, 2:6 dihydroxynaphthalene, 2-hydroxy- - 6 - methoxynaphthalene, 2 - hydroxynaphthalene - 6 - sulfonic acid amide, 1-hydroxynaphthalene - 4 - sulfonic acid amide, 1-acetylamino-7-hydroxynaphthalene, 1-n - butyrylamino - 7 - hydroxynaphthalene; compounds which in a heterocyclic ring contain a carbon atom capable of coupling especially pyrazolones, hydroxy-quinolines and barbituric acids such for example as 3-methyl-1-phenyl-5-pyrazolone, 1,(3' sulfonamido)-phenyl - 3 - methyl-5- pyrazolone, 1-(3'-N-methyl-sulfonamido)-phenyl-3-methyl - 5 - pyrazolone,1-phenyl - 5 - pyrazolone - 3 - carboxylic acid amide, 2:4 - dihydroxyquinoline, 5-chloro-8-hydroxyquinoline and barbituric acid itself; finally compounds which in an open chain contain a carbon atom capable of coupling especially β-keto-carboxylic acid derivatives, especially the arylides such, for example, as acetoacetic acid anilide.

In this case the coupling can also be carried out by the usual known methods, for example, in an alkaline medium.

A number of the two kinds of ortho:ortho'-dihydroxymonoazo-dyestuffs used as starting materials in the present process is known.

The mixture of the two dyestuffs to be metallized may be obtained not only by mixing together the individual dyestuffs but, for example, by coupling two molecular proportions of an ortho-hydroxy-diazo-compound of the kind described above, which contains a nitro group, with one molecular proportion each of two different coupling components of which one contains a sulfonic acid amide group as a substituent if the ortho-hydroxy-diazo-compound contains no sulfonic acid amide group.

As agents yielding metal there come into consideration for the present process, for example, agents yielding cobalt and especially agents yielding chromium.

In carrying out the process it is generally desirable to use a quantity of an agent yielding metal containing approximately one atomic proportion of metal for approximately one molecular proportion each of two different dyestuffs and/or to carry out the metallization in a weakly acid to alkaline medium. Consequently there are especially suitable for the process those metal compounds which are stable in alkaline media such, for example, as cobalt or especially chromium compounds of aliphatic or aromatic ortho-hydroxy-carboxylic acids, which contain the metal in complex union. As examples of aliphatic hydroxycarboxylic acids there may be mentioned, among others, lactic acid, glycolic acid, citric acid and especially tartaric acid, and as aromatic hydroxy-carboxylic acids those of the benzene series such as 4-, 5- or 6-methyl-1-hydroxybenzene-2-carboxylic acid and above all 1-hydroxybenzene-2-carboxylic acid containing no further substituents.

Conversion of the dyestuffs into their complex metal compounds is advantageously carried out at a raised temperature, and under atmospheric or superatmospheric pressure, for example, at the boiling temperature of the reaction mixture, if desired in the presence of suitable additions, for example, in the presence of salts of organic acids, of bases, organic solvents or further agents assisting the formation of complexes.

The dyestuffs obtainable by the process described above can also be prepared by a modification of that process in which an ortho:ortho'-dihydroxymonoazo-dyestuff which contains no metal in complex union and a metal compound of a different ortho:ortho'-dihydroxy-monoazo-dyestuff, which contains about one atom of metal in complex union for each molecule of dyestuff are reacted together, the two ortho:- ortho'-dihydroxy-monoazo-dyestuffs being so chosen that at least one of them contains in addition to the hydroxyl groups a sulfonic acid amide group as the sole salt-forming acid group, and at least one corresponds to the general formula

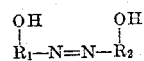

in which $R_1$ and $R_2$ each represent a mononuclear radical of the benzene series free from sulfonic acid groups and carboxyl groups and linked to the azo group in ortho position with respect to the hydroxyl group and one of the radicals $R_1$ and $R_2$ contains at least one nitro group.

The metal compounds of ortho:ortho'-dihydroxy-monoazo-dyestuffs containing per molecule of dyestuff one atom of metal bound in complex union used as starting materials in the above modified process are so-called 1:1-complexes which can be prepared by the usual known methods, for example, by reacting the monoazo-dyestuffs free from metal in complex union in an acid medium with an excess of a cobalt salt or advantageously a salt of trivalent chromium, such as chromium sulfate or chromium fluoride at the boiling temperature or if desired at temperatures exceeding 100° C. If by this method monoazo-dyestuffs of the formula mentioned above, in which one of the hydroxyl groups is replaced by an alkoxy group, is subjected to a de-alkylating metallization there are obtained the same 1:1-complexes serving as starting materials in this modified process. In order to convert the metal-free dyestuffs into the 1:1-complexes it is generally of advantage to conduct the metallization in the presence of an organic solvent, for example, alcohol. Advantageously in this modification of the process there is used as the metalliferous dyestuff, the dyestuff which contains the sulfonic acid amide group. This is of special advantage when the metallization is conducted without or with only a small addition of an organic solvent.

The reaction of the 1:1-metal complexes so obtained with the metal-free dyestuffs is advantageously conducted in an aqueous neutral to weakly alkaline medium at ordinary temperature or a raised temperature. It is generally of advantage to react together approximately equivalent quantities of the metalliferous 1:1-complex and of the metal-free dyestuff, or to use a certain excess not exceeding 20 per cent. of the metalliferous dyestuff.

The new products obtainable by the process first described above and its modification are metal compounds which contain one atom of metal bound in complex union to two molecules of different ortho:ortho'-dihydroxy-monoazo-dyestuffs free from sulfonic acid groups and carboxyl groups, of which at least one contains a sulfonic acid amide group and at least one corresponds to the general formula

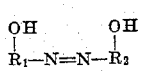

in which $R_1$ and $R_2$ each represent a mononuclear radical of the benzene series linked to the azo group in ortho-position relative to the hydroxyl group and one of the radicals $R_1$ and $R_2$ contains at least one nitro group.

Mixtures of such metalliferous mixed complexes can be prepared by the process first described above or its modification by treating with an agent yielding metal of the above kind simultaneously two or more of the dyestuff mixtures defined above or simultaneously reacting a metalliferous 1:1-complex with two or more metal-free dyestuffs or two or more metalliferous 1:1-complexes with one metal-free dyestuff in suitable relative proportions.

The new metalliferous mixed complexes obtainable by the above process are soluble in water and indeed more soluble than the corresponding complexes which contain per molecule of dyestuff one atom of metal in complex union. They are suitable for dyeing or printing a very wide variety of materials, but above all for dyeing animal materials such as silk, leather and especially wool, but also for dyeing or printing synthetic fibers of superpolyamides or superpolyurethanes. They are suitable above all for dyeing from neutral or weakly acid, for example acetic acid, baths.

The following examples illustrate the invention, the parts and percentages being by weight:

Example 1

2.95 parts of the sodium salt of the dyestuff from diazotized 4-nitro-2-amino-1-hydroxybenzene and 4-methyl-1-hydroxybenzene and 4.74 parts of the sodium salt of the dyestuff from diazotized 4 - nitro- 6´-chloro-2-amino-1-hydroxybenzene and 1 - (3' - sulfonamido) - phenyl - 3 - methyl-5-pyrazolone, both dyestuffs being in the form of a moist paste (filter cake), are stirred in 300 parts of water and mixed with 25 parts of a solution of sodium-potassium chromo-salicylate having a chromium content of 2.6 per cent. After the addition of 6 parts of sulfonated castor oil the whole is boiled for 3 hours under reflux. At the end of this period the metallization is finished. The complex is completely precipitated by acidification with acetic acid, separated by filtration, and the filter cake is dissolved in 700 parts of water and 8 parts of sodium hydroxide solution of 30 per cent. strength at 80° C. The complex is separated from the solution by the addition of sodium chloride. The resulting water-soluble dyestuff dyes wool from a neutral or an acid bath orange-brown tints of good fastness to light and washing.

The above-mentioned solution of sodium-potassium chromosalicylate is obtained by boiling 362 parts of an aqueous solution of chromic sulfate $[Cr_2(SO_4)_3]$ having a chromium content of 7.2 per cent. with 138 parts of salicylic acid, dissolving the resulting chromosalicylic acid by the addition of 166 parts of sodium hydroxide solution of 40 per cent. strength and sufficient potassium hydroxide solution of 37 per cent. strength to give an alkaline reaction to phenol phthalein and making up the solution to 1000 parts with water.

In the following table are given further examples of metal compounds of ortho:ortho'-dihydroxy-azo dyestuffs which can be obtained by the present process. In all cases chromium is the complex-forming metal. In columns I and II are named the two ortho:ortho'-dihydroxymonoazo dyestuffs bound in complex union with chromium and in column III are given the tints of the dyeings obtainable by dyeing 100 parts of wool with 2 parts of the chromium compounds in an acetic acid bath.

| I | II | III |
| --- | --- | --- |
| 4-nitro-6-acetylamino-2-amino-1-hydroxybenzene 4-methyl-1-hydroxybenzene. | 4-nitro-2-amino-1-hydroxybenzene 1-phenyl-3-methyl-5-pyrazolone-3'-sulfonic acid amide. | orange-brown. |
| 4-nitro-6-chloro-2-amino-1-hydroxybenzene 4-acetylamino-1-hydroxybenzene. | ----do---- | yellowish brown. |
| 4-nitro-6-acetylamino-2-amino-1-hydroxybenzene 4-tertiary-amyl-1-hydroxybenzene. | 2-amino-1-hydroxybenzene-4-sulfonic acid amide 1-phenyl-3-methyl-5-pyrazolone. | orange-brown. |
| 4-nitro-2-amino-1-hydroxybenzene 4-methyl-1-hydroxybenzene. | 2-amino-1-hydroxybenzene-4-sulfonic acid amide aceto-acetic acid anilide. | yellowish brown. |
| 4-nitro-6-acetylamino-2-amino-1-hydroxybenzene 4-methyl-1-hydroxybenzene. | 2-amino-1-hydroxybenzene-4-sulfonic acid amide 2:4-dihydroxyquinoline. | brownish bordeaux. |
| 4-nitro-2-amino-1-hydroxybenzene 4-methyl-1-hydroxybenzene. | 2-amino-1-hydroxybenzene-4-sulfonic acid amide barbituric acid. | reddish brown. |
| Do | 2-amino-1-hydroxybenzene-4-sulfonic acid amide 1-acetylamino-7-hydroxynaphthalene. | blackish dark brown. |
| 4-nitro-6-acetylamino-2-amino-1-hydroxybenzene 4-methyl-1-hydroxybenzene. | ----do---- | brown-black. |
| 4-nitro-6-chloro-2-amino-1-hydroxybenzene 4-acetylamino-1-hydroxybenzene. | ----do---- | blackish olive. |
| 4-nitro-2-amino-1-hydroxybenzene 4-methyl-2-acetylamino-1-hydroxybenzene. | ----do---- | blackish dark brown. |
| 4:6-dinitro-2-amino-1-hydroxybenzene 4-methyl-2-acetylamino-1-hydroxybenzene. | ----do---- | blackish olive. |
| 4-nitro-2-amino-1-hydroxybenzene 4-methyl-1-hydroxybenzene. | 6-nitro-2-amino-1-hydroxybenzene-4-sulfonic acid amide 1-acetylamino-7-hydroxynaphthalene. | reddish black. |
| 4-nitro-6-chloro-2-amino-1-hydroxybenzene 4-methyl-2-acetylamino-1-hydroxybenzene. | 4-nitro-6-chloro-2-amino-1-hydroxybenzene 1-phenyl-3-methyl-5-pyrazolone-3'-sulfonic acid amide. | brown. |
| 4:6-dinitro-2-amino-1-hydroxybenzene 4-methyl-2-acetylamino-1-hydroxybenzene. | ----do---- | yellowish brown. |
| 4-nitro-6-chloro-2-amino-1-hydroxybenzene 4-acetylamino-1-hydroxybenzene. | ----do---- | brown. |
| 4:6-dinitro-2-amino-1-hydroxybenzene 4-methyl-2-acetylamino-1-hydroxybenzene. | 2-amino-1-hydroxybenzene-4-sulfonic acid amide aceto-acetic acid-anilide. | khaki. |
| Do | 4-nitro-2-amino-1-hydroxybenzene 1-phenyl-3-methyl-5-pyrazolone-3'-sulfonic acid amide. | yellowish brown. |
| 4:6-dinitro-2-amino-1-hydroxybenzene 4-n-butyrylamino-1-hydroxybenzene. | 4-nitro-6-chloro-2-amino-1-hydroxybenzene 1-phenyl-3-methyl-5-pyrazolone-3'-sulfonic acid amide. | brown. |
| 6-nitro-2-amino-1-hydroxybenzene-4-sulfonic acid amide 4-tertiary-amyl-1-hydroxybenzene. | 6-chloro-4-nitro-2-amino-1-hydroxybenzene 1-phenyl-3-methyl-5-pyrazolone-3'-sulfonic acid amide. | Do. |
| Do | 4-nitro-2-amino-1-hydroxybenzene 1-phenyl-3-methyl-5-pyrazolone. | Do. |
| Do | 2-amino-1-hydroxybenzene-4-sulfonic acid amide 1-n-butyryl-amino-7-hydroxynaphthalene. | grey. |
| Do | 4:6-dinitro-2-amino-1-hydroxybenzene 4-methyl-2-acetyl-amino-1-hydroxybenzene. | dark brown. |
| 4:6-dinitro-2-amino-1-hydroxybenzene 1-acetylamino-7-hydroxynaphthalene. | 6-nitro-2-amino-1-hydroxybenzene-4-sulfonic acid amide 4-tertiary-amyl-1-hydroxybenzene. | violet-brown. |
| 6-chloro-4-nitro-2-amino-1-hydroxybenzene 4-methyl-2-acetylamino-1-hydroxybenzene. | 2-amino-1-hydroxybenzene-4-sulfonic acid amide 1-n-butyryl-amino-7-hydroxynaphthalene. | blackish olive. |

| I | II | III |
|---|---|---|
| 4:6-dinitro-2-amino-1-hydroxybenzene 4-methyl-2-acetylamino-1-hydroxybenzene. | 4-chloro-2-amino-1-hydroxybenzene 1-phenyl-3-methyl-5-pyrazolone-3'-sulfonic acid amide. | reddish brown. |
| Do. | 4-nitro-6-acetylamino-2-amino-1-hydroxybenzene 1-phenyl-3-methyl-5-pyrazolone-3'-sulfonic acid amide. | brown. |
| 4-nitro-6-chloro-2-amino-1-hydroxybenzene-4-acetylamino-1-hydroxybenzene. | do | Do. |

The 6-nitro-2-amino-1-hydroxybenzene-4-sulfonamide used as diazo component in the manufacture of some dyestuffs of this table can be made, e. g. as follows: 230 parts of 2-acetylamino-1-hydroxybenzene-4-sulfonamide are introduced while stirring at 20–30° C. into 560 parts of 98% sulfuric acid. Stirring is continued until dissolution is complete and the solution is then cooled to −2° C. At a temperature of between −2° C. and +2° C., 250 parts of a mixture of 64.3 parts of 98% nitric acid and 185.7 parts of 100% sulfuric acid are added drop by drop. When the addition is complete, the nitration mixture is maintained at a low temperature for a few more hours and then poured onto 1000 parts of ice and 200 parts of sodium chloride. The mixture is stirred over night and the precipitated nitro compound then filtered off. The pale green mass thus obtained is suspended in 375 parts of 10% hydrochloric acid and boiled under reflux for several hours, in the course of which all of it dissolves. After cooling, the faintly brown solution is mixed with organic sodium hydroxide solution until Congo paper just turns violet. The separated brown mass is filtered off and dried. The 6-nitro-2-amino-1-hydroxybenzene-4-sulfonamide can be purified by recrystallization from 85% acetic acid. The red-brown lamellae melt at 213° C.

Analysis:
C found, 30.92%; calculated, 30.88%.
S found, 13.67%; calculated, 13.74%.
N found 17.92; calculated, 18.02%.

*Example 2*

4.0 parts of the sodium salt of the dyestuff from diazotized 4-nitro-6-acetylamino-2-amino-1-hydroxybenzene and 4-tertiary-amyl-1-hydroxybenzene and 3.95 parts of the sodium salt of the dyestuff from diazotized 2-amino-1-hydroxybenzene-4-sulfonamide and 1-phenyl-3-methyl-5-pyrazolone, both dyestuffs being in the form of a moist paste (filter cake) are stirred in 300 parts of water and reacted with a solution of 3 parts of crystalline cobalt sulfate, 0.75 part of tartaric acid in 20 parts of water and 3 parts of sodium hydroxide solution of 30 per cent. strength for one hour at 70–75° C. The cobalt mixed complex thus formed partially crystallizes out. It is completely precipitated by the addition of sodium chloride, separated by filtration and dried. The dyestuff is a brown powder which dissolves in water with a red-brown coloration, in concentrated sulfuric acid with an orange brown coloration and dyes wool from an acetic acid bath orange-brown tints of good fastness to light and washing.

*Example 3*

5.9 parts of the sodium salt of the dyestuff from diazotized 4-nitro-2-amino-1-hydroxybenzene and 4-methyl-1-hydroxybenzene are mixed with a solution of 80 parts of ethyl alcohol and 60 parts of water and, after the addition of 4 parts of chromium fluoride having a chromium content of 31 per cent. and 1 part of formic acid, the whole is heated in closed vessel for 8 hours while stirring at 120–125° C. The ethyl alcohol is then distilled, and the whole is filtered. The chromium complex so obtained contains 1 atomic proportion of chromium for one molecular proportion of ortho:ortho'-dyhydroxyazo dyestuff. The complex is stirred with 9.20 parts of the sodium salt of the dyestuff from diazotized 4-nitro-6-chloro-2-amino-1-hydroxybenzene and 1-(3'-sulfonamido)-phenyl-3-methyl-5-pyrazolone in 500 parts of water, and after the addition of 5 parts of sodiumhydroxide solution of 30 per cent. strength the whole is maintained for one hour at a temperature of 70–75° C. The brown mixed complex so formed is completely precipitated by acidification with acetic acid and filtered. The filter cake is dissolved in 700 parts of water and 8 parts of sodium hydroxide solution of 30 per cent. strength at 80° C. The complex is precipitated from the solution by the addition of sodium chloride. The water-soluble dyestuff so obtained dyes wool from an acetic acid bath orange-brown tints of good fastness to light and washing.

*Example 4*

4.74 parts of the sodium salt of the dyestuff from diazotized 2-amino-1-hydroxybenzene-4-sulfonamide and 1-(3'-sulfonamido)-phenyl-3-methyl-5-pyrazolone are heated at the boil with 100 parts of water, 3 parts of formic acid and 60 parts of a chromium formate solution having a chromium content of 2 per cent., and the whole is maintained at the boil for about 20 hours under reflux. The chromium compound so formed is precipitated by the addition of sodium chloride and separated by filtration. The chromium complex so obtained which contains for one molecule of dyestuff 1 atom of chromium is mixed with 3.4 parts of the sodium salt of the dyestuff from diazotized 4:6-dinitro-2-amino-1-hydroxybenzene and 4-methyl-1-hydroxybenzene, 200 parts of water and 20 parts of sodium carbonate solution of 10 per cent. strength, and then the whole is boiled under reflux for about 3 hours. The resulting mixed complex is separated by the addition of sodium chloride and filtered off. The dried and ground dyestuff is a dark brown powder, which dissolves in water with a red-brown coloration and in concentrated sulfuric acid with an orange brown coloration. The mixed complex dyes wool from an acetic acid bath red-brown tints which are fast to light and washing.

A chromium mixed complex which dyes in a similar manner is obtained by the action of the dyestuff from diazotized 4:6-dinitro-2-amino-1-hydroxybenzene and 4-tertiary-amyl-1-hydroxybenzene on the 1:1-chromium compound of the dyestuff from diazotized 2-amino-1-hydroxybenzene-4-sulfonamide and 1-(3'-sulfonamido)-phenyl-3-methyl-5-pyrazolone.

*Example 5*

8.16 parts of the sodium salt of the dyestuff from diazotized 4-nitro-6-acetylamino-2-amino-1-hydroxybenzene and 4-tertiary amyl-1-hydroxybenzene, 7.94 parts of the sodium salt of the dyestuff from diazotized 4:6-dinitro-2-amino-1-hydroxybenzene and 4-methyl-2-acetylamino-1-hydroxybenzene, and 19 parts of the sodium salt of the dyestuff from diazotized 4-nitro-6-chloro- 2 - amino - 1 - hydroxybenzene and 1-phenyl-3-methyl-5-pyrazolone-3'-sulfonamide, are stirred in 500 parts of water and after the addition of 90 parts of a solution of sodium-potassium chromosalicylate having a chromium content of 2.6 per cent, boiled for 3 hours. The resultant mixed complex is completely precipitated by the addition of sodium chloride and neutralizing with acetic acid. The resultant dyestuff is a dark brown powder which dissolves in water with a brown coloration and dyes wool from an acetic acid bath yellowish-brown shades of good fastness.

*Example 6*

2.11 parts of the sodium salt of the dyestuff from diazotized 2-amino-1-hydroxybenzene-4-sulfonamide and 1-acetylamino - 7 - hydroxynaphthalene, 2.37 parts of the sodium salt of the dyestuff from diazotized 4-nitro-6-chloro-2-amino - 1 - hydroxybenzene and 1-(3'-sulfonamido)-phenyl-3-methyl-5-pyrazolone and 4.08 parts of the sodium salt of the dyestuff from diazotized 4-nitro-6-acetylamino-2-amino-1-hydroxybenzene and 4-tertiary-amyl-1-hydroxybenzene, all the dyestuffs being in the form of a moist paste (filter cake) are stirred in 300 parts of water and after the addition of 25 parts of a solution of sodium-potassium chromosalicylate having a chromium content of 2.6 per cent. and 6 parts of sulfonated castor oil the whole is heated at the boil under reflux for one hour. The resulting solution is evaporated under reduced pressure. The mixed complex so obtained is a water-soluble dark powder which dyes wool from an acetic acid bath brown tints of good fastness to light and washing.

*Example 7*

10.75 parts of the sodium salt of the dyestuff from diazotized 4 - nitro-2-amino-1-hydroxybenzene-6-sulfonamide and 4-tertiary-amyl-1-hydroxybenzene and 9.05 parts of the sodium salt of the dyestuff from diazotized 4-nitro-2-amino-1 - hydroxybenzene and 1-phenyl-3-methyl-5-pyrazolone, both dyes in the form of a moist paste (filter cake), are stirred in 400 parts of water and mixed with 60 parts of a solution of sodium-potassium chromosalicylate having a chromium content of 2.6%. The whole is then refluxed for 3 hours, after which the metallization is finished. The complex is completely precipitated by neutralization with acetic acid and by the addition of sodium chloride. In the dry state, it is a dark brown powder which dissolves in water with a red-brokn coloration and dyes wool from an acetic acid bath pure, reddish brown shades of good fastness.

The dyestuff from diazotized 4-nitro-2-amino-1-hydroxybenzene-6-sulfonic acid amide and 4-tertiary-amyl-1-hydroxybenzene here used can be prepared as follows: 11.6 parts of 4-nitro-2-amino-1-hydroxybenzene-6-sulfonamide are dissolved in 100 parts of water and 6.7 parts of 30% sodium hydroxide solution. After the addition of 3.4 parts of sodium nitrite, the whole is poured into a solution of 17.5 parts of 30% hydrochloric acid and ice, whereby the difficultly water-soluble diazo compound is precipitated. The diazo compound is filtered off and introduced at room temperature into a solution consisting of 9 parts of 4-tertiary-amyl-1-hydroxybenzene, 20 parts of sodium-1-naphthalene sulfonate, 40 parts of water, and 7.6 parts of 30% sodium hydroxide solution, and stirred until the diazo compound can no longer be detected. The resultant dyestuff is completely precipitated by adding sodium chloride and neutralizing with acetic acid. It is a dark brown powder which dissolves in water with a brown coloration and dyes wool from an acetic acid bath in yellowish brown shades which on after-chroming change to a brown of good fastness properties. The dyestuff is also suitable for dyeing wool by the single bath chroming process by which brown shades are also obtained.

The 4-nitro - 2 - amino-1-hydroxybenzene-6-sulfonamide used as starting material may be obtained, e. g. according to this prescription:

305 parts of sodium-2:4-dinitro-1-chlorobenzene-6-sulfonate are entered in small portions into 1200 parts of chlorosulfonic acid while stirring at room temperature and the whole heated for 4 hours to 150–155° C. When the reaction mass has cooled, it is poured onto 3000 parts of ice and the precipitated 2:4-dinitro-1-chlorobenzene-6-sulfonyl-chloride separated by filtration. (The product, when recrystallized from ether, melts at 104–106° C.) After being washed neutral with ice water, the moist paste is stirred with 200 parts of water and 300 parts of ice and then 225 parts of 25% ammonia added to it dropwise in the course of one hour. Stirring is then continued for several hours, followed finally by acidification with hydrochloric acid and filtration. The resultant filter cake of the 2:4-dinitro-1-chlorobenzene-6-sulfonamide (melting point of the product after recrystallization from acetic acid, 188–190° C.) is introduced into a partial solution or suspension of 185 parts of calcium hydroxide in 800 parts of water and the whole refluxed for 4 hours. After acidification with hydrochloric acid the precipitated 2:4-dinitro-1-hydroxy-benzene-6-sulfonamide is filtered off with suction. Its melting point, after recrystallization from acetic acid is at 231–232° C. The product is dissolved at 30° C. in 200 parts of water and 50 parts of 30% sodium hydroxide solution and, after the addition of a solution of 80 parts of sodium hydrosulfide in 100 parts of water, stirred, the temperature rising to 60° C. After partial reduction, the reaction mixture is acidified with hydrochloric acid and the resultant 4-nitro-2-amino-1-hydroxybenzene-6-sulfonamide separated by filtration. After drying, it is a yellowish brown powder, which, after recrystallization from an aqueous sodium carbonate solution melts at 201° C. with decomposition.

*Example 8*

2 parts of the chromiferous dyestuff obtained as described in the first paragraph of Example 1 are dissolved in 4000 parts of water, 10 parts of crystalline sodium sulfate are added and then 100 parts of well wetted wool are entered into the resulting dyebath at 40–50° C. The whole is brought to the boil in the course of ½ hour, and boiling is carried on for ¾ hour at the boil. Finally the wool is rinsed with cold water and dried. The wool is dyed orange-brown tints of good fastness to light and washing.

*Example 9*

2 parts of the chromiferous dyestuff obtained as described in Example 5 are dissolved in 4000 parts of water, 10 parts of crystalline sodium sulfate are added and then 100 parts of well wetted wool are entered into the resulting dyebath at 40–50° C. Then 4 parts of acetic acid of 40 per cent. strength are added, the whole is brought to the boil in the course of ½ hour, and boiling is carried on for ¾ hour at the boil. Finally the wool is rinsed with cold water and dried. The wool is dyed orange-brown tints of good fastness to light and washing.

What is claimed is:

1. A metalliferous compound which contains one atom of a metal selected from the group consisting of cobalt and chromium in complex union with two molecules of different ortho:ortho'-dihydroxymonoazo dyestuffs which are free from sulfonic and carboxylic acid groups, and of which at least one contains a sulfonic acid amide group and at least one corresponds to the formula

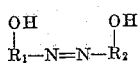

in which $R_1$ and $R_2$ each represent a benzene radical bound to the azo group in ortho-position to the hydroxyl group, and one of the radicals $R_1$ and $R_2$ contains at least one nitro group.

2. A chromiferous compound which contains one atom of chromium in complex union with two molecules of different ortho:ortho'-dihydroxymonoazo dyestuffs which are free from sulfonic and carboxylic acid groups, and of which one contains a sulfonic acid amide group and the other corresponds to the formula

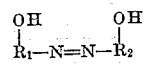

in which $R_1$ and $R_2$ each represent a benzene radical bound to the azo group in ortho-position to the hydroxyl group, and one of the radicals $R_1$ and $R_2$ contains at least one nitro group.

3. A chromiferous compound which contains one atom of chromium in complex union with two molecules of different ortho:ortho'-dihydroxymonoazo dyestuffs which are free from sulfonic and carboxylic acid groups, and of which one corresponds to the formula

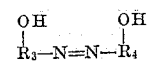

and the other to the formula

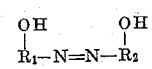

in which formulae $R_1$, $R_2$ and $R_3$ each represent a benzene radical bound to the azo group in ortho-position to the hydroxyl group, and $R_4$ represents the radical of a coupling component bound to the azo group in a position vicinal to the hydroxyl group, one of the radicals $R_1$ and $R_2$ containing at least one nitro group, and at least one of the radicals $R_1$, $R_2$, $R_3$ and $R_4$ containing a sulfonic acid amide group.

4. A chromiferous compound which contains one atom of chromium in complex union with two molecules of different ortho:ortho'-dihydroxymonoazo dyestuffs which are free from sulfonic and carboxylic acid groups, and of which one corresponds to the formula

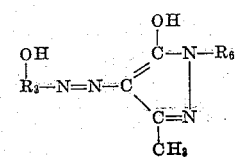

and the other corresponds to the formula

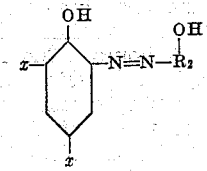

in which formulae $R_2$ and $R_3$ each represent a benzene radical bound to the azo group in ortho-position to the hydroxyl group, one of the $x$'s represents a nitro group and the other $x$ a sulfonic acid amide group, and $R_6$ represents a benzene radical.

5. A chromiferous compound which contains one atom of chromium in complex union with two molecules of different ortho:ortho'-dihydroxymonoazo dyestuffs which are free from sulfonic and carboxylic acid groups, and of which one corresponds to the formula

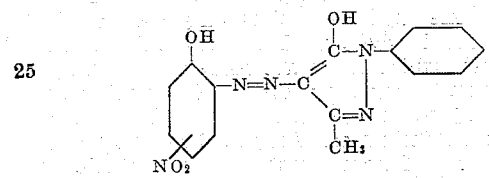

and the other corresponds to the formula

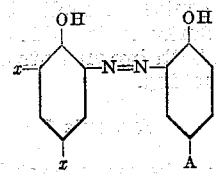

in which A represents a lower alkyl group, one of the $x$'s a nitro group and the other $x$ a sulfonic acid amide group.

6. A chromiferous compound which contains one atom of chromium in complex union with two molecules of different ortho:ortho'-dihydroxymonoazo dyestuffs which are free from sulfonic and carboxylic acid groups, and of which one corresponds to the formula

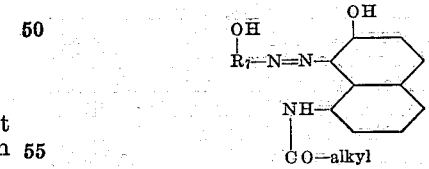

and the other to the formula

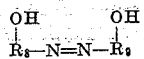

in which formulae $R_7$ represents a benzenesulfonic acid amide radical bound to the azo group in ortho-position to the hydroxyl group, alkyl represents an alkyl radical with one to three carbon atoms, $R_8$ represents a nitrobenzene radical bound to the azo group in ortho-position to the hydroxyl group and $R_9$ represents a benzene radical containing an acetylamino group and bound to the azo group in ortho-position to the hydroxyl group.

7. A chromiferous compound which contains one atom of chromium in complex union with two molecules of different ortho:ortho'-dihydroxymonoazo dyestuffs which are free from sulfonic and carboxylic acid groups, and of which one corresponds to the formula

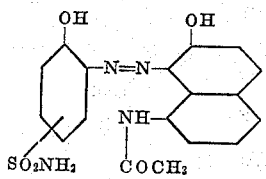

and the other to the formula

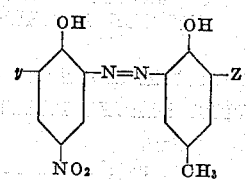

in which $y$ represents a member selected from the group consisting of hydrogen and the nitro group and Z represents a member selected from the group consisting of hydrogen and the acetylamino group.

8. A chromiferous compound which contains one atom of chromium in complex union with two molecules of different ortho:ortho'-dihydroxymonoazo dyestuffs which are free from sulfonic and carboxylic acid groups, and of which one corresponds to the formula

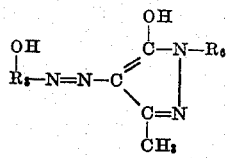

and the other to the formula

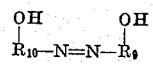

in which formulae $R_8$ and $R_{10}$ each represent a nitrobenzene radical bound to the azo group in ortho-position to the hydroxyl group, $R_6$ represents a benzene radical and $R_9$ represents a benzene radical which contains an acetylamino group and is bound to the azo group in ortho-position to the hydroxyl group, one of the radicals $R_8$ and $R_6$ containing a sulfonic acid amide group.

9. A chromiferous compound which contains one atom of chromium in complex union with two molecules of different ortho:ortho'-dihydroxymonoazo dyestuffs which are free from sulfonic and carboxylic acid groups, and of which one corresponds to the formula

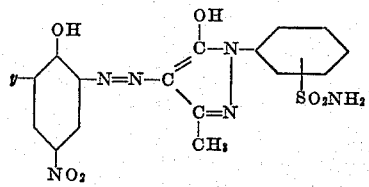

and the other to the formula

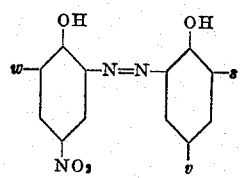

in which formulae $y$ and $w$ each represent a member selected from the group consisting of hydrogen, chlorine, a nitro and an acetylamino group, $s$ represents a member selected from the group consisting of hydrogen and the acetylamino group, and $v$ represents a member selected from the group consisting of the acetylamino and lower alkyl groups.

10. The complex chromium compound which contains one atom of chromium bound in complex union to one molecule of each of the two dyestuffs of the formulae

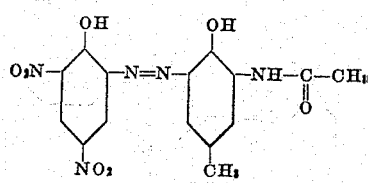

and

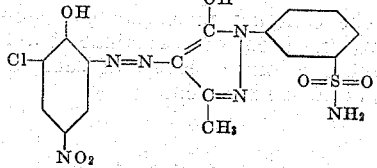

11. The complex chromium compound which contains one atom of chromium bound in complex union to one molecule of each of the two dyestuffs of the formulae

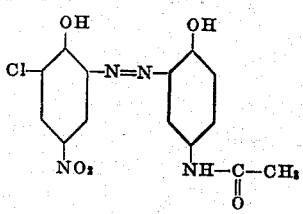

and

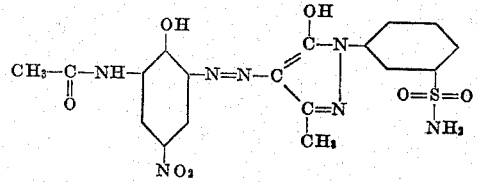

12. The complex chromium compound which contains one atom of chromium bound in complex union to one molecule of each of the two dyestuffs of the formulae

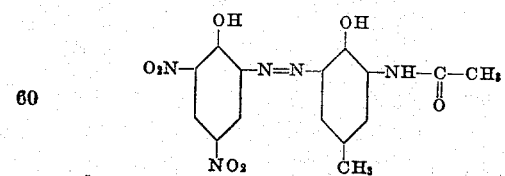

and

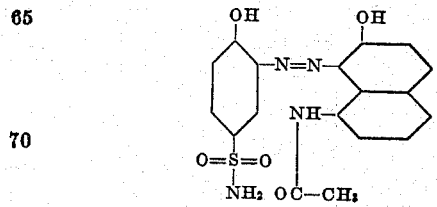

13. The complex chromium compound which contains one atom of chromium bound in complex union to one molecule of each of the two dyestuffs of the formulae

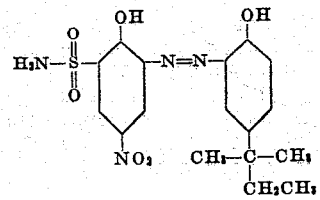

and

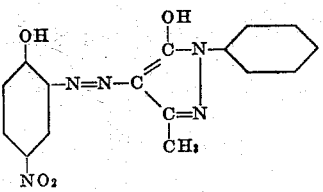

14. The complex chromium compound which contains one atom of chromium bound in complex union to one molecule of each of the two dyestuffs of the formulae

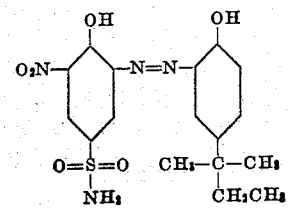

and

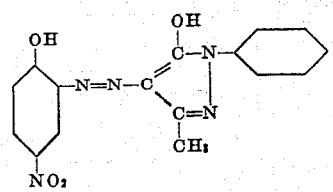

WILLY WIDMER.
CHRISTIAN ZICKENDRAHT.
ARTHUR BUEHLER.

References Cited in the file of this patent

UNITED STATES PATENTS

| Number | Name | Date |
|---|---|---|
| 1,984,096 | Straub et al. | Dec. 11, 1834 |
| 2,104,357 | Straub et al. | Jan. 4, 1938 |
| 2,229,200 | Wehrli | Jan. 21, 1941 |